United States Patent
Yasuda et al.

(10) Patent No.: US 8,648,162 B2
(45) Date of Patent: Feb. 11, 2014

(54) ADHERENCE SUBSTANCE, PRESSURE SENSITIVE ADHESIVE SHEET AND ITS USE

(75) Inventors: Teruhiko Yasuda, Tokyo (JP); Hitoshi Shimoma, Tokyo (JP); Hisashi Sato, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 13/038,573

(22) Filed: Mar. 2, 2011

(65) Prior Publication Data

US 2011/0151250 A1 Jun. 23, 2011

Related U.S. Application Data

(63) Continuation of application No. PCT/JP2009/065357, filed on Sep. 2, 2009.

(30) Foreign Application Priority Data

Sep. 5, 2008 (JP) ................................. 2008-228112

(51) Int. Cl.
C08G 18/38 (2006.01)
C08G 18/10 (2006.01)
C08L 75/04 (2006.01)
C09J 175/00 (2006.01)
C09J 175/04 (2006.01)

(52) U.S. Cl.
USPC ........................................... 528/28; 528/905

(58) Field of Classification Search
USPC .................................. 528/28, 905
See application file for complete search history.

(56) References Cited

U.S. PATENT DOCUMENTS

| | | | |
|---|---|---|---|
| 6,204,350 B1 * | 3/2001 | Liu et al. .......................... | 528/23 |
| 2006/0188725 A1 * | 8/2006 | Yoshida et al. ............ | 428/411.1 |
| 2007/0167584 A1 * | 7/2007 | Fujimoto et al. .............. | 525/474 |
| 2010/0015443 A1 | 1/2010 | Yasuda et al. | |

FOREIGN PATENT DOCUMENTS

| | | | |
|---|---|---|---|
| CN | 1139935 A | | 1/1997 |
| CN | 101175786 A | | 5/2008 |
| JP | 55-137129 | | 10/1980 |
| JP | 60-32871 | | 2/1985 |
| JP | 2003-12751 | | 1/2003 |
| JP | 2005-33000 | | 2/2005 |
| JP | 2005-82777 | | 3/2005 |
| WO | WO 95/21206 | * | 8/1995 |
| WO | 2005/073333 | | 8/2005 |
| WO | 2005/073334 | | 8/2005 |
| WO | 2006/118766 | | 11/2006 |
| WO | WO 2007/040232 A1 | | 4/2007 |
| WO | 2008/123552 | | 10/2008 |

OTHER PUBLICATIONS

Benedek et al.; Pressure-Sensitive Adhesives Technology; Marcel Dekker, Inc.; New York; 1997; pp. 204 and 205.*
U.S. Appl. No. 13/069,447, filed Mar. 23, 2011, Yasuda, et al.
U.S. Appl. No. 13/005,639, filed Jan. 13, 2011, Yasuda, et al.
Combined Chinese Office Action and Search Report Issued Jan. 4, 2013 in Patent Application No. 200980134874.3.

* cited by examiner

*Primary Examiner* — Rabon Sergent
(74) *Attorney, Agent, or Firm* — Oblon, Spivak, McClelland, Maier & Neustadt, L.L.P.

(57) ABSTRACT

To provide an adherence substance which has a low viscosity and good coatability, can be made solvent free, has a low adhesive strength, of which increase with time is small, has good adhesion to a substrate, has excellent adhesion to an adherend and excellent removability, and has a good wettability. An adherence substance which is obtained by curing a curable composition comprising a silyl group-containing polymer (S) obtained by introducing a hydrolyzable silyl group to a molecular terminal of a polyurethane prepolymer obtained by reacting a polyol compound with a polyisocyanate compound, and which has a peel adhesive strength of at most 8N/25 mm.

10 Claims, No Drawings

ADHERENCE SUBSTANCE, PRESSURE SENSITIVE ADHESIVE SHEET AND ITS USE

TECHNICAL FIELD

The present invention relates to an adherence substance, a pressure sensitive adhesive sheet and its use.

BACKGROUND ART

An adhesive is required to adhere to an adherend so that it would hardly be peeled. On the other hand, a pressure sensitive adhesive is formed into a shape of a tape or the like and is required to exhibit good adhesion immediately upon application. At the same time, the pressure sensitive adhesive is required to have removability so that it can be peeled without leaving an adhesive deposit. While permanent adhesion is required for an adhesive, a pressure sensitive adhesive is required to have both temporary adhesion and removability. Thus, although an adhesive and a pressure sensitive adhesive are alike, they are fundamentally different in the required properties.

As conventional pressure sensitive adhesives, an acrylic pressure sensitive adhesive, a rubber pressure sensitive adhesive, a silicone pressure sensitive adhesive, an urethane pressure sensitive adhesive and an oxyalkylene pressure sensitive adhesive are known. Particularly, it has been a recent tendency that an acrylic pressure sensitive adhesive is used in a wide range of applications from a strongly adhesive pressure sensitive adhesive having a strong adhesive strength to a weakly adhesive pressure sensitive adhesive having a weak adhesive strength. However, an acrylic pressure sensitive adhesive has a problem of an odor or dermal irritation in a case where an acrylic monomer remains in the pressure sensitive adhesive. Further, an acrylic pressure sensitive adhesive is likely to undergo a change with time after being applied to an adherend, whereby the adhesive strength tends to increase, or migration tends to be high. Accordingly, there has been a problem such that an adhesive deposit is likely to remain on the adherend, and the removability tends to be inadequate.

In the case of a rubber pressure sensitive adhesive, it is necessary to add a low molecular weight plasticizer to adjust the adhesive performance or for handling efficiency. Therefore, there is a problem such that upon expiration of a long period of time, the low molecular weight plasticizer migrates to the surface, thus bringing about a remarkable deterioration of the performance.

A silicone pressure sensitive adhesive is excellent in heat resistance. However, it is expensive and is used only for special applications.

An urethane pressure sensitive adhesive has a characteristic such that it is excellent in stability with little change with time (Patent Document 1). However, its production process tends to be long, and as compared with an acrylic pressure sensitive adhesive, it tends to be expensive. Further, as the production process is long, there has been a problem that fluctuation in the quality is likely to result, or the process management tends to be cumbersome.

An oxyalkylene pressure sensitive adhesive has a characteristic such that it can be applied without using an organic solvent (Patent Documents 2 and 3). However, bleeding of a tackifier may sometimes occur, and there has been a problem from the viewpoint of the stability of the adhesive strength for a long period of time.

In recent years, a protective sheet or a protective tape has been frequently used during the production of electric components or electronic materials. The purpose is to protect such components or materials from scratching or dusts in the process for transportation, storage, etc. Particularly, in the production of electronic components or optical materials, it is necessary to completely prevent fine dusts from attaching to a product during its production. Because, dusts will cause contamination and thus cause product failure. As such a protective sheet or a protective tape, a pressure sensitive adhesive sheet or a pressure sensitive adhesive tape provided with a pressure sensitive adhesive layer having a low adhesive strength, is employed.

Patent Document 1: JP-A-2003-12751
Patent Document 2: WO2005/73333
Patent Document 3: WO2005/73334

DISCLOSURE OF THE INVENTION

Problems to be Solved by the Invention

A conventional pressure sensitive adhesive such as an acrylic pressure sensitive adhesive has had a problem such that the adhesion to a substrate and wettability is poor or that the adhesive strength tends to increase as the time passes. Particularly in a case where it is desired to produce a pressure sensitive adhesive having a weak adhesive strength, there has been a problem such that even if the composition of the pressure sensitive adhesive is adjusted so that the initial adhesive strength be low, the adhesive strength is likely to increase as the adhesion time becomes long. If the adhesive strength increases, the adherend is likely to be deformed and may possibly be broken. On the other hand, if the composition of the pressure sensitive adhesive is adjusted to make the adhesive strength to be low upon expiration of a certain time, there has been a problem that no adequate adhesive strength is obtainable even at the initial stage. If no adequate adhesive strength is obtainable, it is likely to be peeled from the adherend unintentionally, and it cannot perform a prescribed role as e.g. a protective sheet. Further, the thickness of the pressure sensitive adhesive layer may be made thin in order to control the increase of the adhesive strength. However, in such a case, the holding power has been likely to decrease, or it has been difficult to improve the precision of the thickness.

In the Patent Document 1, at the time of producing a resin as a raw material for the disclosed urethane pressure sensitive adhesive, a slight difference in the reactivity of the raw material is utilized to obtain a polymer having a prescribed structure. However, in order to control the structure by the difference in the reactivity, it is necessary to control the reaction conditions precisely. Consequently, in the production of this resin, control of the molecular weight is difficult, and it was difficult to obtain a pressure sensitive adhesive having a desired performance. Particularly, it was difficult to control the formation of a high molecular weight product and the progress in gelation along with the formation. The molecular weight relates to molecular cohesion and influential over the adhesion and removability. Further, if the gelation proceeds too much, the obtainable composition tends to have a high viscosity. If the composition has a high viscosity, at the time of mold processing of the pressure sensitive adhesive, it tends to be difficult to obtain an adherence substance layer having a prescribed uniform thickness, or the surface of the obtained adherence substance is likely to be not smooth, and thus there has been a problem from the viewpoint of the production. Even if the apparent viscosity is lowered by means of a solvent, there will be a problem such that a thick adherence substance is hardly obtainable, bubbling is likely to result, or a long time is required for drying.

The present invention has been made in view of the above problems and is to provide an adherence substance which has a low viscosity and good coatability, can be made solvent free, has a low adhesive strength, of which increase with time is small, has good adhesion to a substrate, has excellent adhesion to an adherend and excellent removability, and has a good wettability.

Means to Solve the Problems

The present invention provides the following.

[1] An adherence substance which is obtained by curing a curable composition comprising a silyl group-containing polymer (S) obtained by introducing a hydrolyzable silyl group to a molecular terminal of a polyurethane prepolymer obtained by reacting a polyol compound with a polyisocyanate compound, and which has a peel adhesive strength of at most 8N/25 mm.

[2] The adherence substance according to the above [1], wherein the polyurethane prepolymer has a number average molecular weight of from 2,000 to 100,000 and in the silyl group-containing polymer (S), the ratio (molar ratio of MU/MS) of the total amount (MU) of urethane bonds and urea bonds to the amount (MS) of the hydrolyzable silyl group is from 2/1 to 100/1.

[3] An adherence substance which is obtained by curing a curable composition comprising a silyl group-containing polymer (S') obtained by introducing a hydrolyzable silyl group to a molecular terminal of a polyurethane resin obtained by subjecting a polyurethane prepolymer obtained by reacting a polyol compound with a polyisocyanate compound, to a chain extending reaction by using a chain extending agent, and which has a peel adhesive strength of at most 8N/25 mm.

[4] The adherence substance according to the above [3], wherein the polyurethane resin has a number average molecular weight of from 4,000 to 500,000 and in the silyl group-containing polymer (S'), the ratio (molar ratio of MU/MS) of the total amount (MU) of urethane bonds and urea bonds to the amount (MS) of the hydrolyzable silyl group is from 2/1 to 100/1.

[5] The adherence substance according to any one of the above [1] to [4], wherein the polyol compound is a polyether polyol or a polyether polyester polyol having from 2 to 3 hydroxy groups and an average hydroxy value of from 5 to 225 mgKOH/g.

[6] The adherence substance according to any one of the above [1] to [5], wherein the polyisocyanate compound is tolylene diisocyanate or isophorone diisocyanate.

[7] The adherence substance according to any one of the above [1] to [6], wherein the hydrolyzable silyl group is a trialkoxysilyl group.

[8] A process for producing an adherence substance comprising a step (PP1A) of reacting a polyol compound with a polyisocyanate compound to prepare a polyurethane prepolymer; a step (PP2A) of introducing a hydrolyzable silyl group to a molecular terminal of the polyurethane prepolymer to prepare a silyl group-containing polymer (S); and a step (PP3A) of curing a curable composition comprising the silyl group-containing polymer (S) to obtain an adherence substance having a peel adhesive strength of at most 8N/25 mm.

[9] A process for producing an adherence substance comprising a step (PP1B) of reacting a polyol compound with a polyisocyanate compound to prepare a polyurethane prepolymer; a step (PP2B) of subjecting the polyurethane prepolymer to a chain extending reaction by using a chain extending agent to prepare a polyurethane resin; a step (PP3B) of introducing a hydrolyzable silyl group to a molecular terminal of the polyurethane resin to prepare a silyl group-containing polymer (S'); and a step (PP4B) of curing a curable composition comprising the silyl group-containing polymer (S') to obtain an adherence substance having a peel adhesive strength of at most 8N/25 mm.

[10] A pressure sensitive adhesive sheet comprising a substrate layer and at least one adherence substance layer, wherein the adherence substance layer is made of the adherence substance as defined in any one of the above [1] to [7].

[11] A back grinding tape comprising a substrate layer and at least one adherence substance layer, wherein the adherence substance layer is made of the adherence substance as defined in any one of the above [1] to [7].

[12] An optical element protective pressure sensitive adhesive sheet comprising a substrate layer and at least one adherence substance layer, wherein the adherence substance layer comprises the adherence substance as defined in any one of the above [1] to [7].

[13] An optical element having the optical element protective pressure sensitive adhesive sheet as defined in the above [12] bonded thereon.

[14] The optical element according to the above [13], wherein the optical element is a light diffusing plate, a light diffusing sheet or a prism sheet.

Effects of the Invention

According to the present invention, it is possible to obtain an adherence substance which has a low viscosity and good coatability, can be made solvent-free, has a low adhesive strength, of which increase with time is small, has good adhesion to a substrate, has excellent adhesion to an adherend and excellent removability, and has a good wettability, and such an adherence substance is useful for pressure sensitive adhesive sheets, optical element protective pressure sensitive adhesive sheets, and so on.

BEST MODE FOR CARRYING OUT THE INVENTION

In this specification, the molecular weight distribution is a value obtained by dividing the mass average molecular weight (Mw) by the number average molecular weight (Mn). In this specification, the number average molecular weight (Mn), the mass average molecular weight (Mw) and the molecular weight distribution (Mw/Mn) are the molecular weights as calculated as polystyrene obtained by measurement by gel permeation chromatography employing a calibration curve prepared by using a standard polystyrene test sample having a known molecular weight.

In this specification, the average hydroxy value (OHV) is a value measured in accordance with JIS K-1557-6.4.

Further, in this specification, a polyether polyester polyol is a polyol having an ether bond and an ester bond.

Further, in this specification, an adherence property is a property to adhere to an adherend under gentle pressure and to be optionally removable. Further, a pressure sensitive adhesive is a material which has the adherence property and adheres to an adherend under gentle pressure. Further, it has removability and is used for temporary adhesion. On the other hand, an adhesive is different from a pressure sensitive adhesive in that it has a permanent adhesive property.

An adherence substance is a formed product having an adherence property. Further, a pressure sensitive adhesive sheet (which may simply be referred to as an adhesive sheet) is a sheet having an adherence property. However, in this specification, the thickness is not questioned, i.e. a sheet and a film are not distinguished. Usually, the pressure sensitive adhesive sheet is a laminate having at least a substrate layer and an adherence substance layer as constituting elements. Further, a pressure sensitive adhesive tape (which may simply be referred to as an adhesive tape) is a pressure sensitive sheet in the form of a tape.

In this specification, pressure sensitive adhesives may sometimes be classified by the peel adhesive strength (peel strength from the adherend). A case where the peel adhesive strength exceeds 0 N/25 mm and is at most 1 N/25 mm may be referred to as "weakly adhesive"; a case where the peel adhesive strength exceeds 1 N/25 mm and is at most 8 N/25 mm as "low adhesive"; a case where the peel adhesive strength exceeds 8 N/25 mm and is at most 15 N/25 mm as "moderately adhesive"; and a case where the peel adhesive strength exceeds 15 N/25 mm and is at most 50 N/25 mm as "strongly adhesive". Unless otherwise specified, peel adhesive strength is in accordance with the following test method in accordance with the 180° peeling method as defined in JIS Z-0237 (1991)-8.3.1.

That is, in an environment of 23° C., a pressure sensitive sheet test piece to be measured (width: 25 mm) is adhered to a stainless steel plate (SUS 304(JIS)) having a thickness of 1.5 mm and treated by bright annealing, and press-bonded by a rubber roll having a weight of 2 kg. 30 Minutes later, the peel strength (180° peeling, pulling speed: 300 mm/min) is measured by means of a tensile tester as defined in JIS B-7721. Thus obtained value of the peel strength of 30 minutes after adhesion is defined as the "peel adhesive strength" in the present invention.

<Silyl Group-Containing Polymer (S)>

The adherence substance of the present invention is obtained by curing a curable composition comprising a silyl group-containing polymer (S). The silyl group-containing polymer (S) is obtained by introducing a hydrolyzable silyl group to a molecular terminal of a polyurethane prepolymer. The polyurethane prepolymer is obtained by reacting a polyol compound with a polyisocyanate compound.

The proportion of ether bonds in the silyl group-containing polymer (S) is preferably from 40 to 100 mol %, more preferably from 50 to 100 mol %, further preferably from 60 to 100 mol %, in the total (100 mol %) of ether bonds and ester bonds.

<Polyol Compound>

As the polyol compound in the present invention, a polyether polyol, a polyester polyol, a polycarbonate polyol or a polyether polyester polyol may be used. As the polyol compound, one type of such polyols may be used alone or two or more types of them may be used in combination. Particularly it is preferred that at least one type of a polyol having a polyether framework from the viewpoint of ensuring flexibility of the adherence substance. It is considered that the flexibility of an adherence substance has an effect to suppress so-called zipping, which is a phenomenon such that when an adherence substance is peeled from an adherend, it is not smoothly peeled and peeling sound is emitted. Further, by the polyol having a polyether framework, the viscosity of the curable composition can be lowered. Further, it is considered that by the polyol compound having a polyether framework, it is possible to lower the surface resistance of the adherence substance and to suppress the peel electrostatic charge.

The polyol having a polyether framework means a polyol having a polyether moiety, such as a polyether polyol or a polyether polyester polyol.

As the polyol compound used for synthesis of the polyurethane prepolymer, it is particularly preferred to use one or more types of polyols selected from the group consisting of a polyether polyol and a polyether polyester polyol, or to use one or more types of polyols selected from the group consisting of a polyether polyol and a polyether polyester polyol in combination with one or more types of polyols selected from the group consisting of a polyester polyol and a polycarbonate polyol. It is further preferred to use a polyether polyol or a polyether polyester polyol.

The polyether polyol is preferably a polyoxyalkylene polyol. The alkylene group constituting the polyoxyalkylene polyol may, for example, be an ethylene group, a trimethylene group, a tetramethylene group, a pentamethylene group, a hexamethylene group, a propylene group, a butylene group or a methyltrimethylene group. Such a polyether polyol may be obtained by subjecting a corresponding cyclic ether compound or epoxide compound to ring-opening polymerization. The cyclic ether compound may, for example, be tetrahydrofuran or oxetane. The epoxide compound may, for example, be ethylene oxide, propylene oxide or butylene oxide. The polyether polyol may preferably, for example, be polyoxytetramethylene polyol, polyoxyethylene polyol, polyoxypropylene polyol or polyoxyethylene polyoxypropylene polyol.

The polyether polyester polyol may, for example, be a polyol obtained by condensation polymerization of an ether diol with a dibasic acid compound or a polyol obtained by ring-opening copolymerization (particularly preferably random copolymerization) of an epoxide compound with a cyclic ester. The ether diol may, for example, be diethylene glycol, dipropylene glycol, polyoxyethylene glycol, polyoxypropylene glycol or polyoxyethylene polyoxypropylene glycol. The dibasic acid compound may, for example, be phthalic acid, maleic acid, adipic acid or fumaric acid. The cyclic ester (lactone) may, for example, be β-propiolactone (number of carbon atoms: 3), δ-valerolactone (number of carbon atoms: 5) or ε-caprolactone (number of carbon atoms: 6). Among them, ε-caprolactone is more preferred. The epoxide compound is as previously described.

The polyester polyol may, for example, be a polyol obtained by condensation polymerization of a low molecular diol such as ethylene glycol, propylene glycol, 1,4-butanediol or 1,6-hexanediol with the above dibasic acid compound.

The number of hydroxy groups of the polyol compound used for synthesis of the polyurethane prepolymer is preferably from 2 to 3, most preferably 2. That is, it is particularly preferred that a diol is used as the polyol compound. It is because if the number of hydroxy groups is within this range, it is easy to suppress the viscosity of the polyurethane prepolymer to be obtained at a low level.

Further, the average hydroxy value of the polyol compound is preferably from 5 to 225 mgKOH/g, more preferably from 7 to 115 mgKOH/g, particularly preferably from 10 to 112 mgKOH/g. It is because if the average hydroxy value is within this range, it is easy to suppress the viscosity of the polyurethane prepolymer to be obtained at a low level.

<Polyisocyanate Compound>

As the polyisocyanate compound used for synthesis of the polyurethane prepolymer, a known one may be used. Specifically, it may, for example, be a diisocyanate compound such as diphenyl methane diisocyanate, tolylene diisocyanate, xylylene diisocyanate, methylene-bis(cyclohexyl isocyanate), isophorone diisocyanate or hexamethylene diisocyanate. One type of such a diisocyanate compound may be used alone, or two or more types may be used in combination. It is preferred that the polyisocyanate compound has a flexible chain with a view to improve the flexibility of the adherence substance to be obtained. Specifically, it may, for example, be tolylene diisocyanate, m-xylylene diisocyanate or isophorone diisocyanate. Among them, tolylene diisocyanate or isophorone diisocyanate is particularly preferred.

<Polyurethane Prepolymer>

The polyurethane prepolymer in the present invention is obtained by reacting the polyol compound with a polyisocyanate compound. The terminal of the polyurethane prepolymer is an isocyanate group or a hydroxy group, and it is suitably selected according to the method of introducing a hydrolyzable silyl group. That is, it may be an isocyanate group-terminated polyurethane prepolymer or a hydroxy group-terminated polyurethane prepolymer.

At the time of synthesizing the polyurethane prepolymer, the proportion of the polyol of the polyol compound and the polyisocyanate compound to be reacted is suitably selected according to the molecular weight (average hydroxy value) of the polyol compound and the target molecular weight of the polyurethane prepolymer. In the case of obtaining an isocyanate group-terminated polyurethane prepolymer, the proportion of the polyol compound and the polyisocyanate compound to be reacted is preferably such that the isocyanate index is more than 100 and at most 200, more preferably from 105 to 170, wherein the isocyanate index is defined as 100 times the value of the molar ratio of "NCO groups of the polyisocyanate compound/OH groups of the polyol compound". In the case of obtaining a hydroxy group-terminated polyurethane prepolymer, the proportion of the polyol compound and the polyisocyanate compound is preferably at least 50 and less than 100, more preferably from 50 to 98, by the isocyanate index.

The molecular weight of the polyurethane prepolymer is preferably, in the number average molecular weight, from 2,000 to 10,000, more preferably from 3,000 to 80,000.

<Silyl Group-Containing Polymer (S')>

The adherence substance of the present invention may also be obtained by curing a curable composition comprising a silyl group-containing polymer (S'). The silyl group-containing polymer (S') is obtained by introducing a hydrolyzable silyl group to a molecular terminal of a polyurethane resin. The polyurethane resin is obtained by further subjecting the polyurethane prepolymer to a chain extending reaction by using a chain extending agent. The polyurethane prepolymer is the same as in the case of the silyl group-containing polymer (S).

The preferred range of the proportion of ether bonds in the silyl group-containing polymer (S') is also the same as in the case of the silyl group-containing polymer (S).

<Chain Extending Agent>

As the chain extending agent, in the case where an isocyanate group terminated polyurethane prepolymer is used as the polyurethane prepolymer, a low molecular diol or a low molecular diamine is preferred. The low molecular diol is preferably, for example, ethylene glycol, propylene glycol, 1,4-butanediol or 1,6-hexanediol. It is particularly preferably, for example, 1,4-butanediol or 1,6-hexanediol. The low molecular diamine may, for example, be an aliphatic diamine such as ethylenediamine, propylenediamine, trimethylenediamine, tetramethylenediamine, pentamethylenediamine, hexamethylenediamine or 2,2,4-trimethylhexamethylenediamine; an alicyclic diamine such as piperazine, isophoronediamine or dicyclohexylmethane-4,4'-diamine; or an aromatic diamine such as tolylenediamine, phenylenediamine or xylylenediamine. It is preferably, for example, hexamethylenediamine, isophoronediamine or xylylenediamine.

In the case where a hydroxy group-terminated polyurethane prepolymer is used as the polyurethane prepolymer, a diisocyanate compound is preferred as the chain extending agent. The diisocyanate compound is the same as the above one used for the polyurethane prepolymer.

<Polyurethane Resin>

The polyurethane resin in the present invention is obtained by subjecting the polyurethane prepolymer to a chain extending reaction. The terminal of the polyurethane resin is an isocyanate group, a hydroxy group or an amino group, and it is suitably selected according to the method to introduce a hydrolyzable silyl group. That is, the polyurethane resin may be an isocyanate group-terminated polyurethane resin, a hydroxy group-terminated polyurethane resin or an amino group-terminated polyurethane resin.

At the time of synthesizing the polyurethane resin, the proportion of the polyurethane prepolymer and the chain extending agent to be reacted is suitably selected according to the molecular weight of the polyurethane prepolymer and the target molecular weight of the polyurethane resin.

In the case of subjecting an isocyanate group-terminated polyurethane prepolymer to chain extension by using a low molecular diol as the chain extending agent, the proportion of the polyurethane prepolymer and the low molecular diol is preferably such that the isocyanate index is more than 100 and at most 200, more preferably more than 100 and at most 150, wherein the isocyanate index is defined as 100 times the value of the molar ratio of "NCO groups of the polyurethane prepolymer/OH groups of the low molecular diol". If the proportion is within this range, it is possible to obtain the isocyanate group-terminated polyurethane resin. Further, in the case of obtaining a hydroxy group-terminated polyurethane resin, the isocyanate index is preferably at least 50 and less than 100, more preferably from 50 to 98.

In the case of subjecting the isocyanate group-terminated polyurethane prepolymer to chain extension by using a low molecular diamine as the chain extending agent, the proportion of the polyurethane prepolymer and the low molecular diamine is preferably such that the isocyanate index is at least 50 and less than 100, and more preferably from 50 to 98, wherein the isocyanate index is defined as 100 times the value of the molar ratio of "NCO groups of the polyurethane prepolymer/$NH_2$ groups of the low molecular diamine". If the proportions is within this range, it is possible to obtain the amino group-terminated polyurethane resin.

Further, in the case of obtaining an isocyanate group-terminated polyurethane resin, the isocyanate index is preferably more than 100 and at most 200, more preferably more than 100 and at most 150.

In the case of subjecting a hydroxy group-terminated polyurethane prepolymer to chain extension by using a diisocyanate compound as the chain extending agent to obtain the isocyanate group-terminated polyurethane resin, the proportion of the polyurethane prepolymer and the diisocyanate compound is preferably such that the isocyanate index is more than 100 and at most 200, more preferably from 101 to 150, wherein the isocyanate index is defined as 100 times the value of the molar ratio of "NCO groups of the chain extending agent/OH groups of the polyurethane prepolymer".

Further, in the case of obtaining the hydroxy group-terminated polyurethane resin, the isocyanate index is preferably at least 50 and less than 100, more preferably from 50 to 98.

The molecular weight of the polyurethane resin is preferably, in the number average molecular weight, from 4,000 to 500,000, more preferably from 8,000 to 250,000.

<Hydrolyzable Silyl Group>

The hydrolyzable silyl group in the present invention is a silyl group having a hydrolyzable group. Specifically, it is preferably a silyl group represented by —SiX$_a$R$^3_{(3-a)}$, wherein a is an integer of from 1 to 3, and a is preferably from 2 to 3, most preferably 3.

Further, R$^3$ is a C$_{1-20}$ monovalent organic group and is preferably a C$_{1-6}$ monovalent organic group. Specifically, it may, for example, be a methyl group, an ethyl group, a propyl group, a butyl group or a pentyl group. R$^3$ may have a substituent. The substituent may, for example, be a methyl group or a phenyl group.

In the case where the hydrolyzable silyl group has a plurality of R$^3$, each of R$^3$'s may be the same or different from one another. That is, in the case where a is 1, each of two R$^3$'s bonded to one silicon atom (Si), which are independent of each other, represents a C$_{1-20}$ monovalent organic group which may have a substituent.

Further, the above X represents a hydroxy group (—OH) or a hydrolyzable group. The hydrolyzable group may, for example, be —OR group (R is a hydrocarbon group having at most 4 carbon atoms). Such —OR group is preferably an alkoxy group or an alkenyloxy group, particularly preferably an alkoxy group. The number of the carbon atoms of the alkoxy group or the alkenyloxy group is preferably at most 4. Specifically, it may, for example, be a methoxy group, an ethoxy group, a propoxy group or a propenyloxy group. Among them, a methoxy group or an ethoxy group is more preferred. In this case, it is possible to further improve the curing speed of the curable composition.

In the case where the hydrolyzable silyl group has a plurality of X, each of X's may be the same or different from one another. That is, when a is 2 or 3, each of X's which are independent of one another, represents a hydroxy group or a hydrolyzable group.

The hydrolyzable silyl group is preferably a trialkoxysilyl group, more preferably a trimethoxysilyl group or a triethoxysilyl group, particularly preferably a trimethoxysilyl group. It is because the storage stability of the silyl group-containing polymer (S) or (S') is good, and the curing speed of the curable composition is high, which is suitable for production of the adherence substance.

<Introduction of Hydrolyzable Silyl Group>

In the present invention, a hydrolyzable silyl group is introduced to a molecular terminal of the polyurethane prepolymer or the polyurethane resin. The method of introducing a hydrolyzable silyl group may, for example, be a method (Q1) using an isocyanate silane, a method (Q2) using an aminosilane, a method (Q3) using a mercaptosilane, a method (Q4) using an epoxysilane or a method (Q5) using a hydrosilane.

In the silyl group-containing polymer (S) or (S'), the ratio (molar ratio of MU/MS) of the total amount (MU) of urethane bonds and urea bonds to the amount (MS) of the hydrolyzable silyl group is not particularly limited, but MU/MS (molar ratio) is preferably from 2/1 to 100/1, more preferably from 2/1 to 90/1. If the ratio is within this range, adhesive strength and flexibility of the adherence substance can be controlled, and further, the stability of the adhesive strength is good. A urethane bond is formed by a reaction of an isocyanate group and a hydroxy group, and a urea bond is formed by a reaction of an isocyanate group and an amino group. The molar ratio MU/MS can be controlled by e.g. the molecular weight of the prepolymer.

<Method (Q1) Using Isocyanate Silane>

In the method (Q1), the functional group at the terminal of the polyurethane prepolymer or the polyurethane resin is a group reactive with an isocyanate group, and the functional group at the terminal is reacted with an isocyanate silane to introduce a hydrolyzable silyl group.

The isocyanate silane may, for example, be isocyanatomethyltrimethoxysilane, 2-isocyanatoethyltrimethoxysilane, 3-isocyanatopropyltrimethoxysilane, 4-isocyanatobutyltrimethoxysilane, 5-isocyanatopentyltrimethoxysilane, isocyanatomethyltriethoxysilane, 2-isocyanatoethyltriethoxysilane, 3-isocyanatopropyltriethoxysilane, 4-isocyanatobutyltriethoxysilane, 5-isocyanatopentyltriethoxysilane, isocyanatomethylmethyldimethoxysilane, 2-isocyanatoethylethyldimethoxysilane, 3-isocyanatopropyltrimethoxysilane or 3-isocyanatopropyltriethoxysilane.

Among them, 3-isocyanatopropyltrimethoxysilane or 3-isocyanatopropyltriethoxysilane is preferred.

The group reactive with an isocyanate group may, for example, be a hydroxy group or an amino group. In the case of using a hydroxy group, for example, a hydroxy group-terminated polyurethane prepolymer, a hydroxy group-terminated polyurethane resin obtained by further subjecting a hydroxy group-terminated polyurethane prepolymer to a chain extending reaction by using a diisocyanate compound, or a hydroxy group-terminated polyurethane resin obtained by reacting an isocyanate group-terminated polyurethane prepolymer with a low molecular diol may be used.

In the case of using an amino group, for example, an amino group-terminated polyurethane resin obtained by further subjecting an isocyanate group-terminated polyurethane prepolymer to a chain extending reaction by using a low molecular diamine may be used.

A catalyst may be used in this reaction. As the catalyst, a known urethane-forming catalyst may be employed. It may, for example, be an organic acid salt or organic metal compound or a tertiary amine. Specifically, the organic acid salt or organic metal compound may, for example, be a tin catalyst such as dibutyltin dilaurate (DBTDL), a bismuth catalyst such as bismuth tris(2-ethylhexanoate), a zinc catalyst such as zinc naphthenate, a cobalt catalyst such as cobalt naphthenate or a copper catalyst such as copper 2-ethylhexanoate. The tertiary amine may, for example, be triethylamine, triethylenediamine or N-methylmorpholine.

<Method (Q2) Using Aminosilane>

In the method (Q2), the functional group at the terminal of the polyurethane prepolymer or the polyurethane resin is a group reactive with an amino group, and the functional group at the terminal is reacted with an aminosilane to introduce a hydrolyzable silyl group. A group reactive with an amino group may be introduced at the terminal of the polyurethane prepolymer or the polyurethane resin, as the case requires.

The aminosilane may, for example, be 3-aminopropyltrimethoxysilane, 3-aminopropyltriethoxysilane, 3-aminopropyltriisopropoxysilane, 3-aminopropylmethyldimethoxysilane, 3-aminopropylmethyldiethoxysilane, 3-(2-aminoethyl)aminopropyltrimethoxysilane, 3-(2-aminoethyl)aminopropylmethyldimethoxysilane, 3-(2-aminoethyl)aminopropyltriethoxysilane, 3-(2-aminoethyl)aminopropylmethyldiethoxysilane, 3-(2-aminoethyl)aminopropyltriisopropoxysilane, 3-(2-(2-aminoethyl)aminoethyl)aminopropyltrimethoxysilane, 3-(6-aminohexyl)aminopropyltrimethoxysilane, 3-(N-ethylamino)-2-methylpropyltrimethoxysilane, N-(2-aminoethyl)aminomethyltrimethoxysilane, N-cyclohexylaminomethyltriethoxysilane, N-cyclohexylaminomethyldiethoxymethylsilane, ureidopropyltrimethoxysilane, ureidopropyltriethoxysilane, N-phenyl-3-aminopropyltrimethoxysilane, N-phenylaminomethyltrimethoxysilane, N-benzyl-3-aminopropyltrimethoxysilane, N-vinylbenzyl-3-aminopropyltriethoxysilane, N-(3-triethoxysilylpropyl)-4,5-dihydroimidazole, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane or N,N'-bis[3-(trimethoxysilyl)propyl]ethylenediamine.

Among them, 3-aminopropyltrimethoxysilane or 3-aminopropyltriethoxysilane is preferred.

The group reactive with an amino group may, for example, be an isocyanate group, an acryloyl group or a methacryloyl group. In the case of using an isocyanate group, for example, an isocyanate group-terminated polyurethane prepolymer, an isocyanate group-terminated polyurethane resin obtained by further subjecting a hydroxy group-terminated polyurethane prepolymer to a chain extending reaction by using an isocyanate compound, or an isocyanate group-terminated polyurethane resin obtained by further subjecting an isocyanate group-terminated polyurethane prepolymer to a chain extending reaction by using a low molecular diol compound may be used.

In the case of using an acryloyl group or a methacryloyl group, for example, an isocyanate group-terminated polyurethane prepolymer reacted with a hydroxyalkyl acrylate or a hydroxyalkyl methacrylate, or a hydroxy group-terminated polyurethane prepolymer or a hydroxy group-terminated polyurethane resin reacted with an acrylic acid or a methacrylic acid may be used. The hydroxyalkyl acrylate may, for example, be hydroxyethyl acrylate or hydroxybutyl acrylate. The hydroxyalkyl methacrylate may, for example, be hydroxyethyl methacrylate or hydroxybutyl methacrylate. The reaction of an amino group with an isocyanate group is a urea bond-forming reaction. For this reaction, the above urethane-forming catalyst may be employed. The reaction of an amino group with an acryloyl group is Michael addition reaction.

<Method (Q3) Using Mercaptosilane>

In the method (Q3), the functional group at the terminal of the polyurethane prepolymer or the polyurethane resin is a group reactive with a mercapto group, and the functional group at the terminal is reacted with a mercaptosilane to introduce a hydrolyzable silyl group. A group reactive with a mercapto group may be introduced at the terminal of the polyurethane prepolymer or the polyurethane resin, as the case requires.

The mercaptosilane may, for example, be 3-mercaptopropyltrimethoxysilane, 3-mercaptopropylmethyldimethoxysilane, 3-mercaptopropyltriethoxysilane, 3-mercaptopropylmethyldiethoxysilane, mercaptomethyltrimethoxysilane or mercaptomethyltriethoxysilane. Among them, 3-mercaptopropyltrimethoxysilane or 3-mercaptopropyltriethoxysilane is preferred.

The group reactive with a mercapto group may, for example, be an isocyanate group, an acryloyl group or an allyl group. In the case of using an isocyanate group or an acryloyl group, the same compound as in the method (Q2) using an aminosilane may be used. In the case of using an allyl group, the terminal of the polyurethane prepolymer or the polyurethane resin is made into an isocyanate group and then is reacted with an allyl alcohol to obtain an allyl group.

In the reaction of a mercapto group and an isocyanate group, a catalyst may be employed, in the same manner as in a urethane-forming reaction. As the catalyst, a known thiourethane-forming catalyst such as an organic tin compound or a tertiary amine compound may be employed. In the reaction of a mercapto group with an acryloyl group or an allyl group, a radical initiator is preferably used. The radical initiator may, for example, be azobisisobutyronitrile (AIBN).

<Method (Q4) Using Epoxysilane>

In the method (Q4), the functional group at the terminal of the polyurethane prepolymer or the polyurethane resin is a group reactive with an epoxy group, and the functional group at the terminal is reacted with an epoxysilane to introduce a hydrolyzable silyl group. A group reactive with an epoxy group may be introduced at the terminal of the polyurethane prepolymer or the polyurethane resin, as the case requires.

As the epoxy silane, for example, 3-glycidoxypropyltrimethoxysilane, 3-glycidoxypropyltriethoxysilane, 3-glycidoxypropylmethyldimethoxysilane, 2-(3,4-epoxycyclohexyl)ethyltrimethoxysilane or 2-(3,4-epoxycyclohexyl)ethyltriethoxysilane is preferred. Among them, 3-glycidoxypropyltrimethoxysilane or 3-glycidoxypropyltriethoxysilane is more preferred.

The group reactive with an epoxy group may, for example, be a hydroxy group or an amino group. With respect to each of a hydroxy group and an amino group, the same compound as in the method (Q1) using an isocyanate silane may be used. As a catalyst in the reaction with an epoxy group, a known catalyst such as an amine or an acid anhydride may be employed. It may, for example, be a chain aliphatic polyamine, an alicyclic polyamine, an aromatic polyamine, a modified aliphatic polyamine or an imidazole compound. Particularly, a tertiary amine such as N,N-dimethylpiperazine, triethylenediamine, 2,4,6-tris(dimethylaminomethyl)phenol (DMP-30) or benzyldimethylamine (BDMA) is preferred.

<Method (Q5) Using Hydrosilane>

In the method (Q5), the functional group at the terminal of the polyurethane prepolymer or the polyurethane resin is a group capable of being subjected to a hydrosilylation reaction, and the functional group at the terminal is reacted with a hydrosilane to introduce a hydrolyzable silyl group. A group capable of being subjected to a hydrosilylation reaction may be introduced at the terminal of the polyurethane prepolymer or the polyurethane resin, as the case requires.

The hydrosilane may, for example, be trimethoxysilane, triethoxysilane, methyldiethoxysilane, methyldimethoxysilane, phenyldimethoxysilane or 1-[2-(trimethoxysilyl)ethyl]-1,1,3,3-tetramethyldisiloxane, and trimethoxysilane or triethoxysilane is preferred.

The group capable of being subjected to a hydrosilylation reaction may, for example, be an acryloyl group or an allyl group. With regard to each of an acryloyl group or an allyl group, the same compound as in the method (Q3) using a mercaptosilane may be used. In this reaction, it is preferred to use a hydrosilylation catalyst. The hydrosilylation catalyst may, for example, be chloroplatinic acid.

<Production Process of Adherence Substance>

The process for producing an adherence substance of the present invention, in the case of using a silyl group-containing polymer (S), comprises a step (PP1A) of reacting a polyol compound with a polyisocyanate compound to prepare a polyurethane prepolymer; a step (PP2A) of introducing a hydrolyzable silyl group to a molecular terminal of the polyurethane prepolymer to prepare a silyl group-containing polymer (S); and a step (PP3A) of curing a curable composition comprising the silyl group-containing polymer (S) to obtain an adherence substance having a peel adhesive strength of at most 8 N/25 mm.

In the case of using a silyl group-containing polymer (S'), the process for producing an adherence substance of the present invention comprises a step (PP1B) of reacting a polyol compound with a polyisocyanate compound to prepare a polyurethane prepolymer; a step (PP2B) of subjecting the polyurethane prepolymer to a chain extending reaction by using a chain extending agent to prepare a polyurethane resin; a step (PP3B) of introducing a hydrolyzable silyl group to a molecular terminal of the polyurethane resin to prepare a silyl group-containing polymer (S'); and a step (PP4B) of curing a curable composition comprising the silyl group-containing polymer (S') to obtain an adherence substance having a peel adhesive strength of at most 8 N/25 mm.

The steps (PP1A) and (PP1B) of preparing a polyurethane prepolymer are the same steps. Further, the steps (PP2A) and (PP3B) of introducing a hydrolyzable silyl group are the same steps. Further, the steps (PP3A) and (PP4B) of curing a curable composition to obtain an adherence substance are the same steps.

<Steps ((PP1A) and (PP1B)) of Preparing Polyurethane Prepolymer>

A polyurethane prepolymer is obtained by reacting a polyol compound with a polyisocyanate compound. The proportion of the starting materials in the reaction is as described above (refer to section POLYURETHANE PREPOLYMER). Further, in this reaction, a catalyst may be employed. As the catalyst, the above urethane-forming catalyst may be employed. The reaction temperature is preferably from 40 to 160° C., more preferably from 80 to 120° C.

<Step (PP2B) of Preparing Polyurethane Resin>

A polyurethane resin is obtained by subjecting the polyurethane prepolymer to a chain extending reaction by using a chain extending agent. The proportion of the starting materials in the reaction is as described above (refer to section POLYURETHANE RESIN). Further, in this reaction, a catalyst may be employed. As the catalyst, the above urethane-forming catalyst may be employed. The reaction temperature is preferably from 40 to 160° C., more preferably from 80 to 120° C.

<Steps ((PP2A) and (PP3B)) of Introducing Hydrolyzable Silyl Group>

The step of introducing a hydrolyzable silyl group to the polyurethane prepolymer or the polyurethane resin is as described in the above sections of steps (Q1) to (Q5). The proportion of the hydrolyzable silyl group to be introduced (hereinafter also referred to as the hydrolyzable silyl group introducing proportion) is preferably from 50 to 100 mol %, more preferably from 80 to 100 mol %, provided that all terminals that are theoretically reactive is defined as 100 mol %.

<Steps ((PP3A) and (PP4B)) of Curing Curable Composition to Obtain Adherence Substance>

A curable composition comprising the silyl group-containing polymer (S) or (S') is cured to obtain an adherence substance. The curable composition comprising the silyl group-containing polymer (S) or (S') in the present invention has a low viscosity and good coatability. Accordingly, since good coatability can be obtained without a solvent, the curable composition can be made solvent free at the time of forming an adherence substance. Further, since the curable composition is excellent in curing property, when it contacts with water, it gets promptly and solidly cured (moisture-cured) and a cured product can be obtained. The hydrolyzable silyl group ($-SiX_aR^3_{(3-a)}$) contributes to the moisture curing. Further, when the curable composition is applied on a substrate and cured, good adhesion to the substrate can be obtained. The cured product after the curing has good flexibility, good surface wettability and a low adherence property. Thus, it is suitable as an adherence substance layer, which has good wettability and adhesion to the adherend and at the same time has good removability.

The curable composition in the present invention may contain another polymer having a hydrolyzable silyl group. The proportion of such another polymer having a hydrolyzable silyl group is preferably at most 30 mass %, more preferably at most 10 mass %, in the entire curable composition.

<Additives>

The curable composition in the present invention may contain additives. However, in the curable composition, it is preferred not to use a plasticizer. Particularly, it is preferred not to use an ester type plasticizer such as dioctyl phthalate. It is because, if an ester type plasticizer is used, the adhesive strength between the cured product and the substrate may be decreased, and an adhesive deposit may result.

[Curing Agent]

The curable composition in the present invention is cured by contact with water. Accordingly, it reacts with water in the atmosphere to undergo moisture curing. Otherwise, immediately before the curing, water ($H_2O$) may be added as a curing agent. In such a case, the amount of water is preferably from 0.01 to 5 parts by mass, more preferably from 0.01 to 1 part by mass, particularly preferably from 0.05 to 0.5 part by mass, per 100 parts by mass of the total amount of the silyl group-containing polymer (S) or (S') and another polymer having a hydrolyzable silyl group. The amount of the curing agent is adjusted to be at least 0.01 part by mass, whereby the curing can effectively be promoted, and the amount of the curing agent is adjusted to be at most 5 parts by mass, whereby the working time in use can be secured.

[Curing Catalyst]

It is preferred to incorporate a curing catalyst (a curing accelerator) to accelerate the hydrolysis and/or crosslinking reaction of the hydrolyzable silyl groups.

As such a curing catalyst, a known catalyst may suitably be used as a component to accelerate the reaction of the hydrolyzable silyl groups. Specifically, it may, for example, be an organic tin carboxylate such as dibutyltin diacetate, dibutyltin dilaurate, dioctyltin dilaurate, $(n-C_4H_8)_2Sn(OCOCH=CHCOOCH_3)_2$, $(n-C_4H_9)_2Sn(OCOCH=CHCOO(n-C_4H_9))_2$, $(n-C_8H_{17})_2Sn(OCOCH=CHCOOCH_3)_2$, $(n-C_8H_{17})_2Sn(OCOCH=CHCOO(n-C_4H_9))_2$ or $(n-C_8H_{17})_2Sn(OCOCH=CHCOO(iso-C_8H_{17}))_2$; a sulfur-containing organic tin compound such as $(n-C_4H_9)_2Sn(SCH_2COO)$, $(n-C_8H_{17})_2Sn(SCH_2COO)$, $(n-C_8H_{17})_2Sn(SCH_2CH_2COO)$, $(n-C_8H_{17})_2Sn(SCH_2COOCH_2CH_2OCOCH_2S)$, $(n-C_4H_9)_2Sn(SCH_2COO(iso-C_8H_{17}))_2$, $(n-C_8H_{17})_2Sn(SCH_2COO(iso-C_8H_{17}))_2$, $(n-C_8H_{17})_2Sn(SCH_2COO(n-C_8H_{17}))_2$ or $(n-C_4H_9)_2SnS$; an organic tin oxide such as $(n-C_4H_9)_2SnO$ or $(n-C_8H_{17})_2SnO$; a reaction product of at least one ester compound selected from the group consisting of ethyl silicate, dimethyl maleate, diethyl maleate, dioctyl maleate, dimethyl phthalate, diethyl phthalate and dioctyl phthalate, with the above-mentioned organic tin oxide; a chelate tin compound such as $(n-C_4H_9)_2Sn(acac)_2$, $(n-C_8H_{17})_2Sn(acac)_2$, $(n-C_4H_9)_2Sn(OC_8H_{17})(acac)$, $(n-C_4H_9)_2Sn(OC(CH_3)CHCO_2C_2H_5)_2$, $(n-C_8H_{17})_2Sn(OC(CH_3)CHCO_2C_2H_8)_2$, $(n-C_4H_9)_2Sn(OC_8H_{17})(OC(CH_3)CHCO_2C_2H_5)$ or bisacetyl acetonate tin (where the above acac means an acetylacetonate ligand, and $OC(CH_3)CHCO_2C_2H_5$ means an ethyl acetoacetate ligand); a reaction product of at least one alkoxysilane selected from the group consisting of tetramethoxysilane, tetraethoxysilane and tetrapropoxysilane, with the above chelate tin compound; or an organic tin compound containing a $-SnOSn-$ bond, such as $(n-C_4H_9)_2(CH_3COO)SnOSn(OCOCH_3)(n-C_4H_9)_2$ or $(n-C_4H_9)_2(CH_3O)SnOSn(OCH_3)(n-C_4H_9)_2$.

Further, specific examples of the curing catalyst include a bivalent tin carboxylate such as tin 2-ethyl hexanoate, tin n-octylate, tin naphthenate or tin stearate; a metal salt other than a tin salt of an organic carboxylic acid such as octylic acid, oleic acid, naphthenic acid or stearic acid; a metal carboxylate compound such as a calcium carboxylate, a zirconium carboxylate, an iron carboxylate, a vanadium carboxylate, a bismuth carboxylate such as bismuthtris-2-ethyl hexanoate, a lead carboxylate, a titanium carboxylate or a nickel carboxylate; a titanium alkoxide such as tetraisopropyl titanate, tetrabutyl titanate, tetramethyl titanate or tetra(2-ethylhexyl titanate); an aluminum alkoxide such as aluminum isopropylate or mono-sec-butoxyaluminum diisopropylate; a zirconium alkoxide such as zirconium n-propylate or zirconium n-butyrate; a titanium chelate such as titanium tetraacetylacetonate, titanium ethylacetoacetate, titanium octylene glycolate or titanium lactate; an aluminum chelate such as aluminum trisacetylacetonate, aluminum trisethylacetoacetate, or diisopropoxy aluminum ethylacetoacetate; a zirconium compound such as zirconium tetraacetylacetonate, zirconium bisacetylacetonate, zirconium acetylacetonate bisethyl actoacetate or zirconium acetate; an acidic compound such as phosphoric acid, p-toluenesulfonic acid or phthalic acid; an aliphatic monoamine such as butylamine, hexylamine, octylamine, decylamine or laurylamine; an aliphatic diamine such as ethylenediamine or hexanediamine; an aliphatic polyamine such as diethylenetriamine, triethylenetetramine or tetraethylenepentamine; a heterocyclic amine such as piperidine, piperazine or 1,8-diazabicyclo (5.4.0)udecene-7; an aromatic amine such as metaphenylenediamine, an alkanolamine such as monoethanolamine, diethanolamine or triethanolamine; a trialkylamine such as triethylamine; a primary to tertiary ammonium acid salt made of the above amine and an organic acid such as an aliphatic monocarboxylic acid (such as formic acid, acetic acid, octylic acid or 2-ethylhexanoic acid), an aliphatic polycarboxylic acid (such as oxalic acid, malonic acid, succinic acid, glutaric acid or adipic acid), an aromatic monocarboxylic acid (such as benzoic acid, toluic acid or ethylbenzoic acid), an aromatic polycarboxylic acid (such as phthalic acid, isophthalic acid, terephthalic acid, nitrophthalic acid or trimellitic acid), a phenol compound (such as phenol or resorcinol), a sulfonic acid compound (such as an alkyl benzenesulfonic acid, toluenesulfonic acid or benzenesulfonic acid) or a phosphoric acid compound, or an inorganic acid such as hydrochloric acid, hydrobromic acid or sulfuric acid; an ammonium hydroxide such as triethylmethylammonium hydroxide, trimethylbenzylammonium hydroxide, hexyltrimethylammonium hydroxide, octyltrimethylammonium hydroxide, decyltrimethylammonium hydroxide, dodecyltrimethylammonium hydroxide, octyldimethylethylammonium hydroxide, decyldimethylethylammonium hydroxide, dodecyldimethylethylammonium hydroxide, dihexyldimethylammonium hydroxide, dioctyldimethylammonium hydroxide, didecyldimethylammonium hydroxide or didodecyldimethylammonium hydroxide; and an amine compound such as various modified amine to be used as a curing agent for an epoxy resin.

These curing catalysts may be used alone or in combination as a mixture of two or more of them. In a case where two or more of them are combined, it is, for example, preferred to combine an aliphatic monoamine or another above-mentioned amine compound to the above-mentioned metal-containing compound such as a reaction product of the above-mentioned bivalent tin carboxylate, organic tin carboxylate or organic tin oxide with an ester compound, since it is thereby possible to obtain an excellent curability.

In a case where a curing catalyst is to be added, its amount is preferably from 0.001 to 10 parts by mass, more preferably from 0.01 to 5 parts by mass, per 100 parts by mass of the total amount of the silyl group-containing polymer (S) or (S') and another polymer having a hydrolyzable silyl group. When the amount of the curing catalyst is adjusted to be at least 0.001 part by mass, the curing speed can effectively be accelerated, and when the amount of the curing catalyst is adjusted to be at most 10 parts by mass, it is possible to secure a working time at the time of its use.

[Solvent]

The curable composition in the present invention has a low viscosity and can be applied without using any solvent, but it may contain a solvent.

Such a solvent is not particularly limited, and it may, for example, be an aliphatic hydrocarbon, an aromatic hydrocarbon, a halogenated hydrocarbon, an alcohol, a ketone, an ester, an ether, an ester alcohol, a ketone alcohol, an ether alcohol, a ketone ether, a ketone ester or an ester ether.

Among them, it is preferred to employ an alcohol as the solvent, since the storage stability of the curable composition can thereby be improved. Such an alcohol is preferably an alkyl alcohol having from 1 to 10 carbon atoms, more preferably methanol, ethanol, isopropanol, isopentyl alcohol or hexyl alcohol, further preferably methanol or ethanol. Particularly when methanol is employed, if its amount is increased, the curing time of the curable composition can be prolonged. This is an effective technique to prolong a so-called pot life i.e. the time until the curable composition reaches the predetermined viscosity after its preparation.

In a case where a solvent is added to the curable composition, its amount is preferably at most 500 parts by mass, more preferably from 1 to 100 parts by mass, per 100 parts by mass of the total amount of the silyl group-containing polymer (S) or (S') and another polymer having a hydrolyzable silyl group. If the amount exceeds 500 parts by mass, shrinkage of the cured product may occur along with evaporation of the solvent.

[Dehydrating Agent]

In order to improve the storage stability, the curable composition in the present invention may contain a small amount of a dehydrating agent within a range not to impair the effects of the present invention.

A specific example of such a dehydrating agent may, for example, be an alkyl orthoformate such as methyl orthoformate or ethyl orthoformate; an alkyl orthoacetate such as methyl orthoacetate or ethyl orthoacetate; a hydrolyzable organic silicone compound such as methyl trimethoxysilane, vinyl trimethoxysilane, tetramethoxysilane or tetraethoxysilane; or a hydrolyzable organic titanium compound. Among them, vinyl trimethoxysilane or tetraethoxysilane is preferred from the viewpoint of the cost and dehydrating ability.

In a case where a dehydrating agent is incorporated to the curable composition, its amount is preferably from 0.001 to 30 parts by mass, more preferably from 0.01 to 10 parts by mass, per 100 parts by mass of the total amount of the silyl group-containing polymer (S) or (S') and another polymer having a hydrolyzable silyl group.

[Other Additives]

The following filler, reinforcing agent, stabilizer, flame retardant, antistatic agent, release agent or antifungal agent may be incorporated to the curable composition.

The filler or reinforcing agent may, for example, be carbon black, aluminum hydroxide, calcium carbonate, titanium oxide, silica, glass, bone meal, wood meal or fiber flakes.

The stabilizer may, for example, be an antioxidant, an ultraviolet absorber or a light-stabilizer.

The flame retardant may, for example, be a chloroalkyl phosphate, dimethylmethyl phosphonate, ammonium polyphosphate or an organic bromine compound.

The release agent may, for example, be wax, soap or silicone oil.

The antifungal agent may, for example, be pentachlorophenol, pentachlorophenol laurate or bis(tri-n-butyltin) oxide.

Further, to the curable composition, tackifiers may be added for the purpose of improving the adhesion to the substrate.

<Adherence Substance>

The curable composition in the present invention is obtained by mixing the silyl group-containing polymer (S) or (S'), an optionally incorporated another polymer having a hydrolyzable silyl group and additives which may be incorporated as the case requires.

The adherence substance of the present invention is obtained by curing the above curable composition. When the above curable composition is cured, an adherence substance having weak adherence property or low adherence property i.e. a peel adhesive strength of at most 8 N/25 mm. That is, the adherence substance of the present invention is an adherence substance obtained by curing a curable composition comprising the silyl group-containing polymer (S) or (S'), an optionally incorporated another polymer having a hydrolyzable silyl group and additives which may be incorporated as the case requires, and it preferably has a peel adhesive strength of at most 8 N/25 mm, more preferably more than 0 N/25 mm and at most 8 N/25 mm, further preferably more than 0 N/25 mm and at most 1 N/25 mm, particularly preferably from 0.005 to 0.8 N/25 mm. It is preferred that the curable composition in the present invention does not incorporate additives which may increase the adherence property.

The reason why the cured product obtained by curing a curable composition comprising the silyl group-containing polymer (S) or (S') exhibits weak adherence property or low adherence property is not clear, but it is considered that the hydrolyzable silyl group ($-SiX_aR^3_{(3-a)}$) and a urethane bond or urea bond contribute. That is, the polyurethane prepolymer or the polyurethane resin in the present invention has a urethane bond or a urea bond, and at the time of introducing a hydrolyzable silyl group, a urethane bond or a urea bond may also be introduced.

A urethane bond and a urea bond are polar bonds, and thus it is considered that they act to increase cohesion in the silyl group-containing polymer (S) or (S'), adhesion of the adherence substance to a substrate and adherence property to an adherend. On the other hand, it is considered that the hydrolyzable silyl group acts to lower the adherence property of an adherence substance to an adherend. Then, it is considered that weak adherence property or low adherence property is exhibited by their interaction.

Further, the position where a hydrolyzable silyl group is introduced is the molecular terminal of the polyurethane prepolymer or the polyurethane resin, whereby the cohesion can be improved without preventing the molecular motion and the adhesive strength stably is exhibited.

Accordingly, by controlling the ratio (molar ratio of MU/MS) of the total amount (MU) of urethane bonds and urea bonds to the amount (MS) of the hydrolyzable silyl group in the silyl group-containing polymer (S) or (S'), it is possible to control the adhesive strength of the adherence substance, and when the number average molecular weight of the polyurethane prepolymer is from 2,000 to 100,000 or the number average molecular weight of the polyurethane resin is from 4,000 to 500,000 and when the molar ratio MU/MS is from 2/1 to 100/1, it is possible to obtain an adherence substance having a peel adhesive strength of at most 8 N/25 mm.

With regard to a pressure sensitive adhesive sheet which has a substrate and an adherence substance layer thereon and which has a construction such that the adherence substance layer is removably adhered to an adherend, it is preferred that the adhesion between the adherence substance layer and the substrate is high so that they are hard to be peeled, and that, on the other hand, the adherence substance layer and the adherend can be peeled without leaving an adhesive deposit. When the curable composition of the present invention is applied to a substrate and cured, the cured product (adherence substance layer) and the substrate are well adhered. It is considered that polar bonds such as urethane bonds and urea bonds contribute to such good adhesion to a substrate.

Further, the cured product (adherence substance) obtained by curing the curable composition of the present invention can obtain a good wettability to an adherend. It is considered that flexibility of a structure derived from a polyol contributes to such good wettability. That is, when a polyol has a linear structure having no branched structure, it has a molecular structure with which it is likely to move freely and acts to increase the flexibility. Further, a polyol structure wherein a polyether framework is the main component has a relatively low polarity. It is considered that with such a molecular structure, good wettability to an adherend can be obtained. It is considered that, particularly, as the chain length of the polyether framework is longer, the flexibility and the wettability are higher.

<Curing of Curable Composition>

The adherence substance of the present invention is obtainable by curing the curable composition in the present invention. The curable composition may be shaped after the curing. For example, the curable composition may be cured in a suitable form such as a sheet form and then shaped in a predetermined shape by e.g. die cutting, whereupon it can be used alone as an adherence substance. However, it is preferred that the curable composition is coated to a substrate, followed by curing to obtain a laminate.

The conditions for curing the curable composition may be set as the case requires. For example, one having a curable catalyst added, is prepared as the curable composition. A predetermined amount water is added as a curing agent thereto, followed by mixing thoroughly. The mixture is applied on a substrate. The applied thickness is suitably set. Thereafter, the coated substrate is heated in an oven and aged at room temperature, whereby the curable composition can be cured. It is also effective to leave it in a humidified environment at the time of aging at room temperature or after such aging. Heating by e.g. an oven is suitably set depending upon e.g. the heat resistance temperature of the substrate. For example, it is preferred to leave it in an environment of from 60 to 120° C. for from about 1 to 30 minutes. Particularly in a case where a solvent is used, it is preferred to set a constant drying time. However, rapid drying is not desirable, since it causes foaming. Further, in the oven, or after taking it out from the oven, steam may be applied.

Application of the curable composition can be carried out continuously. That is, on a substrate taken out from a roll, the curable composition having a predetermined amount of water mixed, is applied and then heated and dried in an in-line oven. The obtained shaped product (laminate) is wound up, together with a separator if necessary. Such an wound up laminate is stored and aged in a humidified room temperature environment as the case requires to obtain a shaped adherence substance. In another application method, the substrate and the separator in the above method may be reversed. That is, application is initially made on the separator, and later, the substrate may be bonded.

<Laminate (Pressure Sensitive Adhesive Sheet)>

The present invention provides a laminate comprising at least one substrate layer and an adherence substance layer made of the adherence substance of the present invention. In a case where the laminate is in a sheet form, this laminate will be a pressure sensitive adhesive sheet. Otherwise, when the laminate is formed into a tape form, it will be a pressure sensitive adhesive tape.

Further, without using a substrate, on a separator which will be described later, the curable composition is applied and cured to form a cured product, whereupon the separator is peeled off, so that the adherence substance may be used alone. In such a case, a double coated pressure sensitive adhesive tape may, for example, be obtained. The curable composition of the present invention has a low viscosity and is excellent in coating properties even in a case where no solvent is employed. Accordingly, good application is possible to the separator. Specifically, the curable composition is applied to the separator and heated and dried, and further, another separator is laminated thereon, followed by aging, to obtain a pressure sensitive adhesive sheet made of the adherence substance having no substrate. At that time, without using the another separator, winding is carried out by using the back side of the separator initially applied, whereby a roll of the adherence substance may be produced.

The laminate may have another layer, as the case requires. For example, an adhesive layer (including a primer layer) may be provided between the substrate layer and the adherence substance layer to prevent separating between the substrate and the adherence substance. Further, a buffer layer made of e.g. a foam may be provided between the substrate layer and the adherence substance layer. Otherwise, an electrically conductive material layer may be provided between the substrate layer and the adherence substance layer. Such an electrically conductive layer may be obtained by applying an electrically conductive material such as a metal type eclectically conductive material, an ionic electrically conductive material or a carbon type electrically conductive material on the substrate layer. The electrically conductive material may be applied alone or in combination with a binder such as various resins. Further, on the side of the adherence substance layer opposite to the substrate layer, a separator (release liner) layer may be provided. Further, on the side of the substrate layer opposite to the adherence substance layer, a print layer may be provided. When a print layer is provided, printing may be carried out, and the appearance may be improved. Further, an adherence substance layer may be formed on each side of the substrate layer. In this case, double coated pressure sensitive adhesive sheet may, for example, be obtained.

<Substrate>

The material for the substrate is not particularly limited. A preferred example may be a polyester such as polyethylene terephthalate (PET); a polyolefin such as polyethylene, polypropylene or a polyethylene/polypropylene copolymer (block copolymer or random copolymer); a halogenated polyolefin such as polyvinyl chloride; paper such as hard board; a cloth such as woven fabric or nonwoven fabric; or a metal foil such as an aluminum foil. These substrates may be used in combination. For example, a laminate having a PET layer, a metal foil layer and a polyethylene layer laminated may be employed.

The surface of the substrate may not be processed beforehand. Even without carrying out preliminary processing, the surface of paper bonded to the adherence substance layer becomes hardly separated by the adhesive effect along with the curing of the curable composition.

On the other hand, in a case where a polyolefin is used as the substrate, it is preferred to preliminarily treat the surface to be coated with the curable composition, because the peel adhesive strength may sometimes become low with a non-treated surface. The preliminary treatment of the surface of the substrate made of a polyolefin to be coated with the curable composition, may, for example, be corona treatment (corona discharge treatment) or primer treatment. It is particularly preferred to carry out corona treatment, since the treatment is simple, and the process can be simplified.

For example, corona treatment may be carried out on one side of a polypropylene film having a thickness of 100 µm, and a curable composition is applied on this treated surface. After the application, heating and drying are carried out. With the film thus obtained, the side (the back side) having no adherence substance provided may be utilized as a separator, as it is. That is, this film may be wound up as it is to obtain a pressure sensitive adhesive film. That is, it can be wound up in a roll shape without interposing a separator.

<Adherence Substance Layer>

In the pressure sensitive adhesive sheet or the like of the present invention, the thickness of the adherence substance layer is not particularly limited. For example, it is preferably at least 5 µm, more preferably at least 20 µm, further preferably at least 30 µm, from the viewpoint of the coating precision. From the viewpoint of the stability of the adhesive strength and economical efficiency, it is preferably at most 200 µm, more preferably at most 100 µm, further preferably at most 80 µm.

<Separator>

A separator may be laminated to an adhesive surface (the surface on which an adherend is bonded) of the above adherence substance layer.

As such a separator, in addition to paper having the surface treated with a usual release agent, the above-mentioned non-treated polyolefin may be used. Otherwise, one having a polyolefin laminated on a substrate of paper or the like may also be used. Although silicone oil contained in conventional separators may be a cause of contamination of electronic components, by using a polyolefin as a separator, it is possible to prevent contamination by e.g. silicone oil. This is advantageous when the above pressure sensitive adhesive tape is used as a protective sheet for e.g. an electronic device. Further, when a polyolefin is used alone as a separator, recycling of the waste will be easy.

<Application of Pressure Sensitive Adhesive Sheet>

By using the adherence substance of the present invention, it is possible to obtain a pressure sensitive adhesive sheet which provides particularly good wettability and adhesion to an adherend and which at the same time has a low adhesive strength and is excellent in removability. Further, it is possible to obtain a pressure sensitive adhesive sheet having a peel electrostatic charge suppressed and being excellent also in a high speed peeling property. Accordingly, the application of the pressure sensitive adhesive sheet may, for example, be for a protective sheet for electronic material such as electronic substrates, IC chips, etc.; a protective sheet for optical components such as polarizing plates, light diffusing plates, light diffusing sheets, prism sheets, etc.; a protective sheet for various displays; a protective sheet for automobiles; a surface protective film for building boards; a decorative sheet for wall covering; or surface protection of articles such as metal plates, coated steel plates, synthetic resin plates, coated plywood boards and heat reflective glass. In some cases of a relatively large size protective sheet such as a protective sheet for automobiles or use for temporary joint, an adhesive at a certain level around the low adhesive region is required in order not to be peeled by a wind. A surface protective film for building boards is used for protection of floor materials, and it will be removed after completion of interior work. For the use of surface protection of articles such as metal plates, coated steel plates, synthetic resin plates, coated plywood boards and heat reflective glass, it is required to prevent scratches and dusts from attaching and to be easily peeled after use without contaminating the surface of various adherends with a pressure sensitive adhesive.

A protective sheet or a protective tape is peeled and removed upon completion of its role to temporarily fix or protect a component. However, at the time of peeling the protective sheet from the component to which it was bonded, static electricity (so-called peel electrostatic charge) will be caused between the protective sheet and the component. There is a problem that such static electricity generates an adverse effect to a circuit of an electronic component, or dust or foreign particles are likely to deposit on the surface of the component due to such static electricity. Further, a surface protective film of a liquid crystal display (LCD) is also peeled and removed at the time of using the display. When such a protective film is peeled from the liquid crystal display, a peel electrostatic charge may sometimes be generated.

There may be a case of a trouble such that by the peel electrostatic charge, the liquid crystal alignment is disordered, and the image is disturbed.

Accordingly, for the pressure sensitive adhesive sheet to be peeled after being bonded, it is required to suppress the generation of static electricity caused by the peel electrostatic charge or to quickly remove the generated static electricity. Because, the surface electrification of the adherend will cause deposition of dust or foreign particles on the adherend, or will cause deterioration of the function of the adherend.

Further, the tensile strength (peel strength) required to peel a pressure sensitive adhesive sheet usually tends to be large as the tension rate (the peeling speed) becomes high. For example, a surface protective sheet for e.g. an electronic device such as a display, a polarizing plate, an electronic substrate or an IC chip is preferably peeled smoothly at a high speed. It is required that the peel strength in the case of peeling at a high speed will not be large as compared with the peel strength in the case of peeling at a low speed. That is, a protective sheet is required to have a low speed dependency of the peel strength and to be excellent in the high speed peeling property.

The pressure sensitive adhesive sheet of the present invention satisfies such requirements and is particularly useful as a protective sheet to be peeled during the production process, such as a protective sheet for electronic materials or a protective sheet for optical components. That is, the adhesive strength is low and the removability is good, and at the same time the peel electrostatic charge is low, and the high speed peeling property is excellent.

Further, the adherence substance of the present invention is excellent not only in flexibility but also in wettability. Therefore, even when unevenness is present on the surface of the adherend, good adhesion can be secured. Thus, the pressure sensitive adhesive sheet of the present invention is suitable as a protective pressure sensitive adhesive sheet for optical components. Further, the pressure sensitive adhesive sheet of the present invention is excellent in adhesion so that no substantial displacement occurs in the adhesion area of the bonded adherend, and it has a low peel adhesive strength and can easily be peeled, such being useful for the improvement of the productivity in the process for producing liquid crystal panels, etc.

That is, the pressure sensitive adhesive sheet of the present invention is useful as a protective film for light diffusing plates or prism sheets, particularly as a protective film for their uneven surfaces. Further, an optical component having the pressure sensitive adhesive sheet of the present invention bonded, can be peeled with a low peel adhesive strength, since the change with time of the adhesive strength of the adherence substance is small, and such a peel adhesive strength will not substantially change. Therefore, storage of an optical component for a long period of time will be possible.

Further, the pressure sensitive adhesive sheet of the present invention is useful also as a back grinding tape. The back grinding tape is a tape to protect the surface of a wafer during back grinding (grinding of the rear surface of a wafer) after forming a electronic circuit on a semiconductor wafer. The back grinding tape is bonded on the circuit surface to prevent a damage to the circuit surface or to prevent contamination of the wafer surface by penetration of grinding water or grinding dust. The pressure sensitive adhesive sheet of the present invention is excellent in adhesion so that displacement will not substantially occur in the adhesion area of the bonded adherend, but it has a low peel adhesive strength and can easily be peeled. In a case where a polyolefin is used as the substrate, a separator is not required, and no contamination with e.g. silicone occur. Further, the peel electrostatic charge is suppressed, and a danger of damaging the circuit is little.

EXAMPLES

Now, the present invention will be described in further detail with reference to Examples. However, it should be understood that the present invention is by no means restricted to such Examples.

In the following, propylene oxide will be abbreviated as PO and dibutyltin dilaurate as DBTDL. As water, pure water was used. As a stainless steel plate, a SUS-304 alloy plate defined in JIS was used. The surface of this stainless steel plate treated by bright annealing was substantially flat and glossy.

Preparation Example 1

Preparation of Silyl Group-Containing Polymer (S1)

[Preparation of Polyurethane Prepolymer]

401.6 g of polyoxypropylenediol having Mn=8,000 (average hydroxy value=14 mgKOH/g) obtained by ring-opening polymerization of PO with propylene glycol and 17.8 g of isophorone diisocyanate (hereinafter sometimes abbreviated as IPDI) were subjected to a reaction at a temperature of 85° C. for 6 hours to obtain an isocyanate group-terminated polyurethane prepolymer (Mn: 17,000). As a catalyst, 0.01 g (25 ppm) of dibutyltin dilaurate (hereinafter sometimes abbreviated as DBTDL) was used. The isocyanate index (the value of 100 times the molar ratio NCO/OH) was 160.

[Introduction of Silyl Group]

1.05 molar equivalents of 3-aminopropyltrimethoxysilane (product name: KBM-903, manufactured by Shin-Etsu Chemical Co., Ltd.) to the NCO group of the obtained polyurethane prepolymer was added. That is, the molar ratio represented by NCO/NHR is about 0.95. Reaction was carried out at 85° C. for 2 hours until the NCO peak by IR (infrared spectroscopy) disappeared to obtain a polymer (S1) having a trimethoxysilyl group. The introducing proportion of hydrolyzable silyl groups was 100 mol %.

The viscosity of the obtained polymer (S1) was 289,000 mPa·s/25° C. Further, the molar ratio MU/MS in the polymer (S1) was 2.7.

Values of major parameters are shown in Table 1 (the same will be applied to the following).

Preparation Example 2

Preparation of Silyl Group-Containing Polymer (S2)

[Preparation of Polyurethane Prepolymer]
390.1 g of polyoxypropylenediol having Mn=7,000 (average hydroxy value=16 mgKOH/g) obtained by ring-opening polymerization of PO with propylene glycol and 18.9 g of IPDI were reacted at a temperature of 85° C. for 6 hours to obtain an isocyanate group-terminated polyurethane prepolymer (Mn: 15,000). As a catalyst, 0.01 g (25 ppm) of DBTDL was employed. The isocyanate index was 150.
[Introduction of Sily Group]
In the same manner as in Preparation Example 1, the obtained polyurethane prepolymer was reacted with 3-aminopropyltrimethoxysilane at a temperature of 85° C. for 2 hours to obtain a polymer (S2) having a trimethoxysilyl group. The introducing proportion of hydrolyzable silyl groups was 100 mol %. The viscosity of the polymer (S2) was 430,000 mPa·s/25° C. The molar ratio MU/MS in the polymer (S2) was 2.9.

Preparation Example 3

Preparation of Silyl Group-Containing Polymer (S3)

[Preparation of Polyurethane Prepolymer]
359.4 g of polyoxypropylenediol having Mn=2,000 (average hydroxy value=56.1 mgKOH/g) obtained by ring-opening polymerization of PO with propylene glycol and 60.0 g of IPDI were reacted at a temperature of 85° C. for 6 hours to obtain an isocyanate group-terminated polyurethane prepolymer (Mn: 5,000). As a catalyst, 0.01 g (25 ppm) of DBTDL was employed. The isocyanate index was 150.
[Introduction of Silyl Group]
In the same manner as in Preparation Example 1, the obtained polyurethane prepolymer was reacted with 3-aminopropyltrimethoxysilane at a temperature of 85° C. for 2 hours to obtain a polymer (S3) having a trimethoxysilyl group. The introducing proportion of hydrolyzable silyl groups was 100 mol %. The viscosity of the polymer (S3) was 150,000 mPa·s/25° C. The molar ratio MU/MS in the polymer (S3) was 3.0.

Preparation Example 4

Preparation of Silyl Group-Containing Polymer (S4)

In this Example, a hydroxy group-terminated polyurethane prepolymer was used.
[Preparation of Polyurethane Prepolymer]
406.6 g of polyoxypropylenediol having Mn=8,000 (average hydroxy value=14 mgKOH/g) obtained by ring-opening polymerization of PO with propylene glycol and 6.0 g of IPDI were reacted at a temperature of 85° C. for 6 hours to obtain a hydroxy group-terminated polyurethane prepolymer (Mn=17,000). As a catalyst, 0.01 g (25 ppm) of DBTDL was employed. The isocyanate index was 50.
[Introduction of Silyl Group]
0.97 molar equivalent of 3-isocyanatopropyltrimethoxysilane to the hydroxy groups of the obtained polyurethane prepolymer was added. That is, the molar ratio represented by NCO/OH is about 0.97. The reaction was carried out at a temperature of 85° C. for 12 hours until the NCO peak by IR disappeared to obtain a polymer (S4) having a trimethoxysilyl group. The introducing proportion of hydrolyzable silyl groups was 97 mol %.

The viscosity of the polymer (S4) was 59,000 mPa·s/25° C. The molar ratio MU/MS in the polymer (S4) was 2.2.

Preparation Example 5

Preparation of Silyl Group-Containing Polymer (S5)

In this Example, a chain-extended polyurethane resin was used. Further, a hydrolyzable silyl group was introduced by the above method (Q2).
[Preparation of Polyurethane Prepolymer]
373.3 g of polyoxypropylenediol having Mn=2,000 (average hydroxy value=56.1 mgKOH/g) obtained by ring-opening polymerization of PO with propylene glycol and 48.8 g of tolylene diisocyanate (TDI) were reacted at a temperature of 85° C. for 3 hours to obtain an isocyanate group-terminated polyurethane prepolymer (Mn: 40,000). As a catalyst, 0.01 g (25 ppm) of DBTDL was employed. The isocyanate index was 150.
[Chain Extending Reaction]
To the obtained urethane prepolymer, 431.6 g of a mixed solvent of ethyl acetate/methyl ethyl ketone=1/1 (ratio by weight) was added. 1,4-Butanediol was added so that the molar ratio NCO/OH for the NCO groups of the prepolymer became 1.04, and the reaction was carried out at a temperature of 60° C. for 10 hours.
[Introduction of Silyl Group]
1.05 molar equivalents of aminopropyltrimethoxysilane to be NCO groups of the obtained isocyanate group-terminated polyurethane resin (Mn=41,000) were added. That is, the molar ratio represented by NCO/NHR is about 0.95. The reaction was carried out until the NCO peak by IR disappeared to obtain a polymer (S5) having a trimethoxysilyl group. The introducing proportion of hydrolyzable silyl groups was 100 mol %.

The solution viscosity of the polymer (S5) (solid content: 50 mass %) was 3,000 mPa·s/25° C. The molar ratio MU/MS in the polymer (S5) was 80.

Reference Preparation Example 1

Preparation of Composite Metal Cyanide Complex Catalyst

By the following method, a zinc hexacyanocobaltate having tert-butyl alcohol as an organic ligand (hereinafter referred to as TBA-DMC catalyst) was prepared.

In this Example, polyol X is a polyol having number average molecular weight (Mn) of 1,000, obtained by addition-polymerizing propylene oxide to dipropylene glycol.

Firstly, in a 500 ml flask, an aqueous solution comprising 10.2 g of zinc chloride and 10 g of water, was put, and while stirring this aqueous solution at 300 rpm and maintaining it at 40° C., an aqueous solution comprising 4.2 g of potassium hexacyanocobaltate ($K_3[Co(CN)]_6$) and 75 g of water, was dropwise added over a period of 30 minutes. After completion of the dropwise addition, the mixture was further stirred for 30 minutes. Thereafter, a mixture comprising 40 g of ethylene glycol mono-tert-butyl ether (hereinafter abbreviated as EGMTBE), 40 g of tert-butyl alcohol (hereinafter abbreviated as TBA), 80 g of water and 0.6 of polyol X, was added to the above mixture, followed by stirring at 40° C. for 30 minutes and then at 60° C. for 60 minutes. The obtained reaction mixture was subjected to filtration over a period of 50 minutes by means of a circular filtration plate with a diameter of 125 mm and a quantitative filter paper for fine particles (No. 5C manufactured by ADVANTEC) under pressure (0.25 MPa) to separate solid.

Then, to this cake containing the composite metal cyanide complex, a mixture comprising 18 g of EGMTBE, 18 g of TBA and 84 g of water, was added, followed by stirring for 30 minutes, whereupon pressure filtration (filtration time: 15 minutes) was carried out. To the cake containing the composite metal cyanide complex obtained by the filtration, a mixture comprising 54 g of EGMTBE, 54 g of TBA and 12 g of water, was further added, followed by stirring for 30 minutes, to obtain an EGMTBE/TBA slurry containing the composite metal cyanide complex having an organic ligand. This slurry was used as TBA-DMC catalyst.

5 g of this slurry was taken into a flask, preliminarily dried in a nitrogen stream and then dried under reduced pressure at 80° C. for 4 hours. The obtained solid was weighed, whereby the concentration of the composite metal cyanide complex contained in this slurry was found to be 4.70 mass %.

Comparative Preparation Example 1

Preparation of Another Silyl Group-Containing Polymer (P1)

In this Example, polyoxypropylene polyol was used instead of a polyurethane prepolymer. The silyl group-containing polymer obtained in this Example does not have either a urethane bond or a urea bond.

A polymerization reaction was carried out under a condition of 120° C. while gradually adding 2,480 g of PO into a reactor in the presence of 1.2 g of a zinc hexacyanocobaltate-glyme complex catalyst by using, as an initiator, a mixture of 120 g of a polyoxypropylenediol (hereinafter referred to as diol A) having Mn=3,000 obtained by ring-opening polymerization of propylene oxide (PO) with dipropylene glycol and 200 g of a polyoxypropylenetriol (hereinafter referred to as triol B) having Mn=5,000 obtained by ring-opening polymerization of PO with glycerol. After adding the entire amount of PO, the polymerization reaction was carried out until the internal pressure of the reactor no longer decreased. Here, the zinc hexacyanocobaltate-glyme complex catalyst can be produced in Reference Preparation Example 1 by using glyme instead of EGMTBE and TBA.

Then, 120 g of diol A and 200 g of triol B were introduced into the reactor, and in the same manner as above, 1,680 g of PO was gradually added and then the reaction was carried out until the internal pressure of the reactor no longer decreased. Further, 120 g of diol A and 200 g of triol B were introduced into the reactor, and in the same manner as above, 1,280 g of PO was gradually added, and then, the reaction was carried out until the internal pressure of the reactor no long decreased. Further, 80 g of diol A and 130 g of triol B were introduced into the reactor, and further in the same manner as above, 590 g of PO was gradually added, and the reaction was carried out until the internal pressure of the reactor no longer decreased.

Further, 60 g of diol A and 100 g of triol B were added, and in the same manner as above, 240 g of PO was gradually added, and then, the reaction was carried out until the internal pressure of the reactor no longer decreased.

Finally, 75 g of diol A and 125 g of triol B were added, and in the same manner as above, 200 g of PO was gradually added, and then the reaction was carried out until the internal pressure of the reactor no longer decreased.

By this operation, a polyoxypropylene polyol F having Mn of 17,000 and Mw/Mn of 1.76 was obtained.

To the obtained polyoxypropylene polyol F, a methanol solution of sodium methoxide corresponding to 1.05 molar equivalent to hydroxy groups of polyol F, was added, and methanol was distilled off under reduced pressure under heating to convert terminal hydroxy groups of the polyoxypropylene polyol to sodium alkoxide. Then, allyl chloride (1.2 molar equivalents to hydroxy groups) was reacted thereto at a temperature of 90° C. for 4 hours, and then unreacted allyl chloride was removed, and further, a byproduct salt was removed, to obtain a polyoxypropylene having terminal allyl groups. Further, methyldimethoxysilane (1.2 molar equivalents) was reacted to the polyoxypropylene having terminal allyl groups in the presence of a platinum catalyst at a temperature of 90° C. for 4 hours to obtain an oxypropylene polymer (P1) having methyldimethoxysilyl groups at the terminals.

The obtained polymer (P1) had Mn of 20,000, Mw/Mn of 1.35 and a viscosity of 19,500 mPa·s/25° C.

Comparative Preparation Example 2

Preparation of Acrylic Resin Type Pressure Sensitive Adhesive (A1)

A four-necked flask equipped with a stirrer, a reflux condenser, a nitrogen-introducing tube, a thermometer and a dropping funnel was charged with 37.5 parts by mass of ethyl acetate. Another container was charged with 100 parts by mass of 2-ethylhexyl acrylate. 25 Parts by mass of the above 2-ethylhexyl acrylate was added into the four-necked flask, and then air in the flask was replaced with nitrogen gas. Then, 0.08 parts by mass of azobisisobutyronitrile (AIBN) as a polymerization initiator was added into the four-necked flask. Then, with stirring, the temperature in the flask was raised to 80° C. in a nitrogen atmosphere, and the initial reaction was carried out for about 20 minutes. Further, while heating was continued and while a mixture composed of the remained 75 parts by mass of the monomer, 32.5 parts by mass of ethyl acetate and 0.24 part by mass of AIBN was sequentially added over about 1.5 hours, the reaction was carried out under reflux. Further, the temperature was maintained in the reflux state for 1.5 hours to let the reaction proceed. Then, a solution of 25 parts by mass of ethyl acetate in which 0.25 parts by mass of AIBN was solved was dropwise added over 30 minutes, and the reaction was carried out for another 2 hours. After completion of the reaction, 35 parts by mass of ethyl acetate and 20 parts by mass of tert-butyl alcohol were added to the obtained reactant mixture to dilute it, thereby to obtain an acrylic resin type pressure sensitive adhesive A1 comprising an acrylic resin solution having a solid content of 40.1 mass %. The mass-average molecular weight (Mw) of the acrylic resin in the obtained acrylic resin type pressure sensitive adhesive A1 was 550,000. This mass-average molecular weight is a value in terms of polystyrene, which is measured by gal permeation chromatography.

Examples 1 to 5 and Comparative Examples 1 and 2

Each of the silyl group-containing polymers (S-1 to S-5), the polymer (P1) obtained in Preparation Examples 1 to 5 and Comparative Preparation Example 1, and the acrylic resin type pressure sensitive adhesive (A1) obtained in Comparative Preparation Example 2 was applied on a PET film (substrate) having a thickness of 100 μm so that the layer thickness after drying would be 50 μm, and dried at 100° C. for 5 minutes in a circulation system oven. Then, after aging at 23° C. for 1 week, it was left at 23° C. under a relative humidity of 65% for 2 hours to form an adherence substance layer, thereby to obtain a pressure sensitive adhesive sheet.

As a curing catalyst for the silyl group-containing polymers (S-1 to S-5) and the polymer (P1), 1 part by mass of DBTDL per 100 parts by mass of the solid content was employed.

(Evaluation Methods)

Measurement of peel strength and evaluations of adhesion and wettability were carried out by the following methods. The results are shown in Table 1.

[Peel Strength]

The obtained pressure sensitive adhesive sheet was bonded to a 1.5 mm-thick stainless steel plate treated by bright annealing at room temperature and was press-bonded by a rubber roll of 2 kg. Upon expiration of 30 minutes, 24 hours (1 day), 168 hours (7 days), 336 hours (14 days) and 672 hours (28 days), the peel strength (180° peel at a tension speed of 300 mm/min) was measured by using a tensile tester (RTE-1210, manufactured by ORIENTEC Co., Ltd.) prescribed in JIS 87721. It is shown that as this value is smaller, the adhesive strength is lower and the peeling is easier, and the removability is excellent. The value of the peel strength of 30 minutes after the bonding corresponds to the "peel adhesive strength" in the present invention.

"Floating resulted" in the Table means that the adherence substance layer of the pressure sensitive adhesive sheet does not adhere to the substrate and is in a state of an anchor failure.

Further, the ratio (672 hours after bonding/30 minutes after bonding) of the peel strength 28 days (672 hours) after bonding based on the peel strength 30 minutes after bonding is included in Table 1. It is shown that as this value is larger, increase with time of the adhesive strength is larger.

[Adhesion]

The pressure sensitive adhesive sheet was bonded to a stainless steel plate treated by bright annealing, and then each sample was left at 23° C. under a relative humidity of 65% for 30 minutes, and then the pressure sensitive adhesive sheet was peeled, whereupon the residual adhesive was visually evaluated. By the visual evaluation, one where no transfer of the adhesive to the stainless plate was observed was evaluated to be ○ (good), one where transfer of the adhesive was partially observed, was judged to be Δ (slightly good), and one where the adhesive was transferred completely was judged to be X (no good).

No transfer of the adhesive to the stainless plate means that the adhesion between the substrate and the adherence substance layer of the pressure sensitive adhesive sheet is good, so that the adherence substance layer is likely to be peeled from the stainless steel plate as an adherend and the adherence substance layer is hard to be peeled from the substrate.

[Wettability]

On a stainless steel plate treated by bright annealing, 25 mm×100 mm of the pressure sensitive adhesive sheet was placed at 23° C. so that the adhesive surface became the lower surface, and the wet area after static standing for 3 minutes was visually evaluated. The case where the entire adhesive surface was wet was evaluated to be ○, the case where about ⅔ of the adhesive surface was wet was evaluated as "N1", the case where about ½ of the adhesive surface was wet was evaluated as "N2", and the case where ⅓ or less of the adhesive surface was wet was evaluated as "N3", and N1 to N3 were regarded as being inadequate.

TABLE 1

|  |  | Comp. Ex. 1 | Ex. 1 | Ex. 2 | Ex. 3 | Ex. 4 | Ex. 5 | Comp. Ex. 2 |
|---|---|---|---|---|---|---|---|---|
|  | Silyl group-containing polymer | P1 | S1 | S2 | S3 | S4 | S5 | A1 |
| Polyether polyol | Number of hydroxy groups | Polyoxypropylene Polyol F | 2 | 2 | 2 | 2 | 2 | Acrylic resin type pressure sensitive adhesive |
|  | Average hydroxy value (mgKOH/g) | Mn = 17,000 | 14 | 16 | 56.1 | 14 | 56.1 |  |
|  | Polyisocyanate compound |  | IPDI | IPDI | IPDI | IPDI | TDI |  |
|  | Mn of polyurethane prepolymer |  | 17,000 | 15,000 | 5,000 | 17,000 | — |  |
|  | Mn of polyurethane resin |  | — | — | — | — | 41,000 |  |
| Silyl group-containing polymer | Molar ratio MU/MS | 0 | 2.7 | 2.9 | 3 | 2.2 | 80 |  |
|  | Solid content (%) | 100 | 100 | 100 | 100 | 100 | 50 |  |
|  | Viscosity (mPa · s/25° C.) | 19,500 | 289,000 | 430,000 | 150,000 | 59,000 | 3,000 |  |
|  | 180° C. peeling, bright annealed SUS |  |  |  |  |  |  |  |
| Peel strength (N/25 mm) | 30 minutes after bonding | 0.23 | 0.2 | 0.2 | 0.2 | 0.4 | 3.0 | 0.20 |
|  | 24 hours after bonding | 0.56 | 0.3 | 0.3 | 0.2 | 0.5 | 4.0 | 0.30 |
|  | 168 hours after bonding | Floating resulted | 0.3 | 0.4 | 0.2 | 1.0 | 5.0 | 0.40 |
|  | 336 hours after bonding | Floating resulted | 0.2 | 0.4 | 0.3 | 1.2 | 5.5 | 0.50 |
|  | 672 hours after bonding | Floating resulted | 0.2 | 0.3 | 0.2 | 0.2 | 6.0 | 0.70 |
|  | Ratio of peel strength (672 hours after bonding/ 30 minutes after bonding) | — | 1 | 1.5 | 1 | 0.5 | 2 | 3.5 |
|  | Adhesion to substrate | X | ○ | ○ | ○ | ○ | ○ | ○ |
|  | Wettability | ○ | ○ | ○ | ○ | ○ | ○ | N3 |

As shown in Table 1, while each of the adherence substances obtained by curing the silyl group-containing polymers (S) in Examples 1 to 5 had low adhesion and good removability, it had an adhesive strength of which increase with time was small and maintained good adhesion to the adherend after a period of time. Further, it had a good adhesion to a substrate and also had a good wettability to the adherend. Further, although a solvent was added in Example 5, each adherence substance in Example 1 to 4 had low viscosity and was able to be applied without a solvent.

By contrast, although the polymer (P1) in Comparative Example 1, wherein the silyl group-containing polymer does not have either a urethane bond or a urea bond, had low viscosity and was able to be applied without a solvent, the adherence substance obtained by curing this polymer resulted in floating after a period of time and had a low adhesion to a substrate.

Further, the acrylic resin type adhesive A1 in Comparative Example 2 has an adhesive strength of which increase with time is large and no good wettability.

INDUSTRIAL APPLICABILITY

The pressure sensitive adhesive sheet formed from the curable composition of the present invention has a low adhesive strength and good removability, as well as a small peel electrostatic charge and an excellent high speed peeling property, and therefore it is industrially useful as a protective sheet for electronic materials, a protective sheet for optical components, a protective sheet for various displays, a protective sheet for automobiles, a surface protective film for building boards, a decorative sheet for wall covering, a surface protective sheet for articles such as coated steel plates, and so on.

The entire disclosure of Japanese Patent Application No. 2008-228112 filed on Sep. 5, 2008 including specification, claims and summary is incorporated herein by reference in its entirety.

What is claimed is:

1. An adherence substance which is obtained by curing a curable composition comprising a silyl group-containing polymer (S) obtained by introducing hydrolyzable silyl groups to from 80 to 100 mol % of molecular terminals of a polyurethane prepolymer obtained by reacting a polyol compound with a polyisocyanate compound, and which has a peel adhesive strength of at most 8N/25 mm as measured in accordance with the 180° peeling method as defined in JIS Z-0237 (1991)-8.3.1,
    wherein said polyurethane prepolymer has a number average molecular weight of from 2,000 to 100,000 and a molar ratio of a total amount (MU) of urethane bonds and urea bonds to an amount (MS) of hydrolysable silyl groups (MU)/(MS) in said silyl group containing polymer (S) is from 2/1 to 100/1.

2. The adherence substance according to claim 1, wherein the polyol compound is a polyether polyol or a polyether polyester polyol having from 2 to 3 hydroxy groups and an average hydroxy value of from 5 to 225 mgKOH/g.

3. The adherence substance according to claim 1, wherein the polyisocyanate compound is tolylene diisocyanate or isophorone diisocyanate.

4. The adherence substance according to claim 1, wherein the hydrolyzable silyl group is a trialkoxysilyl group.

5. A process for producing the adherence substance according to claim 1, comprising a step (PP1A) of reacting a polyol compound with a polyisocyanate compound to prepare a polyurethane prepolymer; a step (PP2A) of introducing a hydrolyzable silyl group to a molecular terminal of the polyurethane prepolymer to prepare a silyl group-containing polymer (S); and a step (PP3A) of curing a curable composition comprising the silyl group-containing polymer (S) to obtain an adherence substance having a peel adhesive strength of at most 8N/25 mm.

6. A pressure sensitive adhesive sheet comprising a substrate layer and at least one adherence substance layer, wherein the adherence substance layer is made of the adherence substance as defined in claim 1.

7. A back grinding tape comprising a substrate layer and at least one adherence substance layer, wherein the adherence substance layer is made of the adherence substance as defined in claim 1.

8. An optical element protective pressure sensitive adhesive sheet comprising a substrate layer and at least one adherence substance layer, wherein the adherence substance layer comprises the adherence substance as defined in claim 1.

9. An optical element having the optical element protective pressure sensitive adhesive sheet as defined in claim 8 bonded thereon.

10. The optical element according to claim 9, wherein the optical element is a light diffusing plate, a light diffusing sheet or a prism sheet.

* * * * *